(12) United States Patent
Pferdekämper et al.

(10) Patent No.: US 7,756,813 B2
(45) Date of Patent: Jul. 13, 2010

(54) ELECTRONIC DATA STRUCTURE FOR CONTROLLING ACCESS TO DATA OBJECTS USING LOCKS

(75) Inventors: Thorsten Pferdekämper, Walldorf (DE); Martin Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 786 days.

(21) Appl. No.: 10/526,751

(22) PCT Filed: Sep. 4, 2003

(86) PCT No.: PCT/EP03/09833

§ 371 (c)(1),
(2), (4) Date: Nov. 14, 2005

(87) PCT Pub. No.: WO2004/025506

PCT Pub. Date: Mar. 25, 2004

(65) Prior Publication Data

US 2006/0149736 A1 Jul. 6, 2006

Related U.S. Application Data

(60) Provisional application No. 60/408,902, filed on Sep. 9, 2002, provisional application No. 60/408,901, filed on Sep. 9, 2002, provisional application No. 60/408,905, filed on Sep. 9, 2002, provisional application No. 60/408,903, filed on Sep. 9, 2002, provisional application No. 60/409,606, filed on Sep. 11, 2002, provisional application No. 60/409,593, filed on Sep. 11, 2002.

(51) Int. Cl.
*G06F 7/00* (2006.01)
*G06F 17/30* (2006.01)
*G06F 12/00* (2006.01)
*G06F 13/00* (2006.01)
*G06F 13/28* (2006.01)
*G06F 9/46* (2006.01)
*G06F 15/16* (2006.01)

(52) U.S. Cl. ............... 707/8; 707/2; 707/9; 707/200; 707/203; 707/204; 711/147; 718/102; 709/210

(58) Field of Classification Search ............ 707/2, 707/8, 9, 203, 204, 200; 718/102; 711/147; 709/210

See application file for complete search history.

(56) References Cited

U.S. PATENT DOCUMENTS 5,327,556 A 7/1994 Mohan et al.

(Continued)

FOREIGN PATENT DOCUMENTS

EP 0 499 422 A2 8/1992

(Continued)

OTHER PUBLICATIONS

Tanenbaum; "Synchronization in Distributed System", Modern Operating Systems, Prentice-Hall International, Inc., New Jersey, XP002266518; ISBN: 0-13-5957524, pp. 494-496 (1992).

(Continued)

*Primary Examiner*—Wilson Lee
*Assistant Examiner*—Cheryl M Shechtman
(74) *Attorney, Agent, or Firm*—Finnegan, Henderson, Farabow, Garrett & Dunner, LLP

(57) ABSTRACT

A data structure is provided for preventing access, in a computer system, to a data object having an identifier (ID). The data structure comprises a first lock object, in which the ID of the data object is stored, and in which a link to a storage location of the data object is assigned to the ID, and a second lock object, in which the ID of the data object is stored. In one embodiment, the ID is stored in the second lock object before storing the ID in the first lock object or before assigning the storage location of the data object to the ID in first lock object. Further, the ID is deleted from the second lock object after storing the ID in the first lock object or after assigning the storage location of the data object to the ID in the first lock object. The data object may be accessible by a software application, whereby the access of the software application to the data object is prevented if the ID is stored in the first or second lock object.

14 Claims, 9 Drawing Sheets

U.S. PATENT DOCUMENTS

| | | | |
|---|---|---|---|
| 5,504,900 A | | 4/1996 | Raz |
| 5,548,750 A | | 8/1996 | Larsson et al. |
| 5,557,792 A | | 9/1996 | Josten et al. |
| 5,566,319 A | * | 10/1996 | Lenz ................. 711/147 |
| 5,748,870 A | | 5/1998 | Tims et al. |
| 5,761,660 A | | 6/1998 | Josten et al. |
| 5,822,773 A | | 10/1998 | Pritchard et al. |
| 5,835,906 A | * | 11/1998 | Hagersten et al. ........... 707/8 |
| 5,835,953 A | | 11/1998 | Ohran |
| 5,913,213 A | | 6/1999 | Wikstrom et al. |
| 6,088,693 A | | 7/2000 | Van Huben et al. |
| 6,226,641 B1 | | 5/2001 | Hickson et al. |
| 6,269,382 B1 | | 7/2001 | Cabrera et al. |
| 6,324,581 B1 | | 11/2001 | Xu et al. |
| 6,334,134 B1 | | 12/2001 | Haderle et al. |
| 6,343,296 B1 | | 1/2002 | Lakhamraju et al. |
| 6,353,836 B1 | | 3/2002 | Bamford et al. |
| 6,405,274 B1 | | 6/2002 | Chan |
| 6,412,034 B1 | | 6/2002 | Chan |
| 6,507,853 B2 | | 1/2003 | Bamford et al. |
| 6,557,082 B1 | | 4/2003 | Josten et al. |
| 6,594,683 B1 | * | 7/2003 | Furlani et al. ........... 718/102 |
| 6,651,123 B1 | | 11/2003 | Hutchison et al. |
| 6,772,155 B1 | | 8/2004 | Stegelmann |
| 6,772,177 B2 | | 8/2004 | Hsiao et al. |
| 6,772,255 B2 | | 8/2004 | Daynes |
| 6,775,750 B2 | | 8/2004 | Krueger |
| 6,839,819 B2 | | 1/2005 | Martin |
| 6,850,938 B1 | | 2/2005 | Sadjadi |
| 6,880,102 B1 | | 4/2005 | Bridge |
| 6,944,615 B2 | | 9/2005 | Teng et al. |
| 6,950,834 B2 | | 9/2005 | Huras et al. |
| 6,952,707 B1 | | 10/2005 | Josten |
| 7,028,287 B2 | * | 4/2006 | Bak et al. ............ 717/108 |
| 7,036,043 B2 | | 4/2006 | Martin et al. |
| 7,222,142 B2 | | 5/2007 | Fischer et al. |
| 7,251,661 B1 | | 7/2007 | Reed et al. |
| 2001/0056425 A1 | | 12/2001 | Richard |
| 2002/0087476 A1 | | 7/2002 | Salas et al. |
| 2003/0004945 A1 | | 1/2003 | Teng et al. |
| 2003/0004975 A1 | | 1/2003 | Nakano et al. |
| 2006/0101094 A1 | | 5/2006 | Fischer et al. |
| 2006/0129768 A1 | | 6/2006 | Pferdekaemper et al. |
| 2006/0149696 A1 | | 7/2006 | Pferdekaemper et al. |
| 2006/0149736 A1 | | 7/2006 | Pferdekaemper et al. |
| 2006/0155704 A1 | | 7/2006 | Fischer et al. |

FOREIGN PATENT DOCUMENTS

| | | |
|---|---|---|
| EP | 1 283 477 | 2/2003 |

OTHER PUBLICATIONS

PCT Search Report mailed Mar. 30, 2004 for PCT/EP2003/09828.

Martin Fischer et al., U.S. Appl. No. 10/656,208, filed Sep. 8, 2003, entitled "Methods and Systems for Controlling Access to a Data Object."

Martin Fischer et al., U.S. Appl. No. 10/526,747, filed Nov. 14, 2005, entitled "Methods and Systems for Moving Data Objects."

Thorsten Pferdekaemper et al., U.S. Appl. No. 10/526,748, filed Nov. 8, 2005, entitled "Methods and Systems for Data Moving Using Locks."

Thorsten Pferdekaemper et al., U.S. Appl. No. 10/526,504, filed Oct. 24, 2005, entitled "Methods and Systems for Archiving Data."

Martin Fischer et al., U.S. Application No. 10/526,749, filed Nov. 14, 2005, entitled "Methods and Systems for Moving Data Using Locks."

Thorsten Pferdekaemper et al., U.S. Appl. No. 10/526,750, filed Nov. 14, 2005, entitled "Methods and Systems for Controlling Access to a Data Object by Means of Locks."

R. Schaarschmidt et al., "Konzepte und Implementierungsaspekte anwendungsorientierten Archivierens in Datenbanksystemen," Computer Science, Research & Development, 1998, vol. 13, pp. 79-89.

Ralf Schaarschmidt et al., "Datenbankbasiertes Archivieren im SAP System R/3," WI—Essay, Sep. 1996.

Daugherty et al., "Multi-Axial Subassemblage Testing System (Mast) Data Collection and Telepresence Systems Specification," A Report from the National Science Foundation, George E. Brown, Jr. Network for Earthquake Engineering Simulation (NEES), Department of Civil Engineering, Institute of Technologoy, University of Minnesota, Jul. 15, 2002, pp 1-23.

Stefani; "Datenarchivierung MIT SAP"; SAP Press, Galileo Press, Bonn X P002266517, ISBN: 3-89842-212-7, pp. 35-40, 57, 63-75, 84-85, and 211-212, (2002).

Cabrera, Luis-Felipe et al., "Applying Database Technology in the ADSM Mass Storage System," Proceedings of the 21st VLDB Conference, 1995, pp. 597-605.

* cited by examiner

Fig. 2

Table 1 (201)

| Field A | Field B | Field C | ... | Field X |
|---|---|---|---|---|
| A | B | | | |
| | | | | |
| B | C | | | |
| C | F | | | |
| ... | ... | | | |

201.x

Table 2 (202)

| Field A | Field B | Field C | ... | Field Y |
|---|---|---|---|---|
| E | L | | | |
| F | K | | | |
| | | | | |
| C | F | | | |
| ... | ... | | | |

Permanent Lock Object (203)

| ID 1 | Archive |
|---|---|
| AB | 001 |
| BB | 002 |
| BC | 002 |
| CF | 003 |
| ... | |

Transactional Lock Object (204)

| ID 2 |
|---|
| AB |
| |
| BC |
| CF |
| ... |

ELECTRONIC DATA STRUCTURE FOR CONTROLLING ACCESS TO DATA OBJECTS USING LOCKS

This application is a national stage filing under 35 U.S.C. 371 of International Application No. PCT/EP03/009833, filed on Sep. 4, 2003, which published in the English language, and claims the benefit of priority to U.S. Provisional Application Nos. 60/408,901, filed on Sep. 9, 2002, 60/408,902, filed on Sep. 9, 2002, 60/408,903, filed on Sep. 9, 2002, 60/408,905, filed on Sep. 9, 2002, 60/409,606, filed on Sep. 11, 2002, and 60/409,593, filed on Sep. 11, 2002.

BACKGROUND OF THE INVENTION

1. Field of the Invention

The technical field of this invention is in the area of electronic data processing. More particularly, the invention relates to data structures, methods, computer program products and systems for accessing data objects, particularly in the context of data moving.

2. Description of the Related Art

Moving of data objects is well known to every user of a computer and is a standard procedure, which is routinely applied. A special application of moving data objects is the archiving process, by which data objects are moved from a first to a second storage location for safety and/or performance reasons. In enterprises, enterprise resource planning software (ERP) applications are used to control or support business processes and the management of the enterprise. ERP software is further used to manage company information of enterprises of various kinds in any field of technology by means of automatic data processing systems such as computers or computer systems. During the use of such software a huge amount of data is usually created, which contains important business information and which has to be archived from time to time.

According to the state of the art (see Helmut Stefani, Datenarchivierung mit SAP, Galileo Press GmbH, Bonn 2002, ISBN 3-89842-212-7), archiving can be performed automatically by archiving software tools, which can be part of the ERP software. Such tools can consist of a writing module, which stores (writes) the data objects to be archived sequentially in archive files, and a deleting module, which deletes the successfully archived data from the original data object base. The writing module can select the data objects to be archived from the data base according to specific criteria, e.g. the creation time of the data. It usually does not modify the original data objects or data base. The deleting module staggeredly reads the archive file sequentially and deletes the data objects found in the archive file from the original data base. This ensures that only such data objects are deleted from the original data base, which are readably stored in the archive file. The time for the archiving procedure as a whole depends on the amount of data and varies from a few milliseconds to several hours or days. Consequently, there is in many cases a considerable time gap between writing the data into the archive file and deleting the data from the original data base. This time gap can be a reason for the following problems:

As long as the data objects are still available in the original database, they can still be modified by any software application during the time gap. Because the deleting program does not compare the archived data object and the data object to be deleted, such modifications can be lost. This has not only the consequence of the loss of the amended data, it can additionally have the consequence that certain business processes can not be completed.

Another problem arises if several archiving processes run in parallel. In this scenario, that one data object can be archived several times, and no longer unambiguously identifiable. This can have the consequence that evaluations or statistical analysis, which use the archive files, produce wrong results.

It is also possible that data objects in the original database are read by the writing module and are simultaneously modified by an other software application. In such a case, the data can be transferred from an archiveable status to a non-archiveable status. As a result, data objects which are not archiveable are written into the archive file and are deleted from the original database. In effect, this can result in a loss of data.

Thus, there is a need for a data structure, method, software application and/or data processing system providing a more efficient solution of the problems described above, particularly it is desirable to provide a data structure for enabling an effective prevention of the modification of a data object during a moving or archiving process.

SUMMARY OF THE INVENTION

In accordance with the invention, as embodied and broadly described herein, methods and systems consistent with the principles of the invention provide a data structure for enabling preventing in a computer system an access to a data object having an identifier (ID), comprising:

In accordance with one embodiment of the invention, as embodied and broadly described herein, methods and systems consistent with the principles of the invention provide a data structure for preventing in a computer system access to a data object having an identifier (ID), comprising:

a first lock object, in which the ID of a data object is stored, and in which a link to a storage location of the data object is assigned to the ID, and a second lock object in which the ID of the data object is stored, the lock objects being accessible by a software application.

By accessing this data structure, software applications, which may require access to data objects, can check by querying the lock objects, whether the data to be accessed are subject to a moving process or not. If the data are subject to a moving process, the access to that data can be postponed until the moving is completed.

In accordance with another embodiment of the invention, as embodied and broadly described herein, systems consistent with the principles of the invention are provided for preventing access to a data object having an identifier (ID), comprising:

memory means having program instructions;

input means for entering data;

storage means for storing data;

a processor responsive to the program instructions; and a data structure comprising:

a first lock object, in which the ID of a data object is stored, and in which a link to a storage location of the data object is assigned to the ID, and a second lock object in which the ID of the data object is stored, the lock objects being accessible by a software application.

The invention and its embodiments are further directed to a computer readable medium and a carrier signal comprising instructions for processing data according to the inventive method and in its embodiments.

One advantage of the invention and its embodiments is that the security against data loss in data moving and archiving procedures may be greatly improved. This may enable the avoidance of spending a lot of time and/or money for data retrieval.

Additional objects and advantages of the invention and its embodiments will be set forth in part in the description, or can be learned by practice of the invention. Objects and advantages will be realized and attained by means of the elements and combinations particularly pointed out in the appended claims. Embodiments of the invention are disclosed in the detailed description section and in the dependent and appended claims as well.

It is understood that both the foregoing general description and the following detailed description are exemplary and explanatory only and are not restrictive of the invention and its embodiments, as claimed.

BRIEF DESCRIPTION OF THE DRAWINGS

The accompanying drawings, which are incorporated in and constitute a part of this specification, illustrate examples of embodiments of the invention and, together with the description, explain the principles of the invention. In the drawings.

FIG. 2 is a schematic diagram of an exemplary structure of the first and second lock object and a data object in accordance with the principles of the invention.

DETAILED DESCRIPTION

Figure 1:
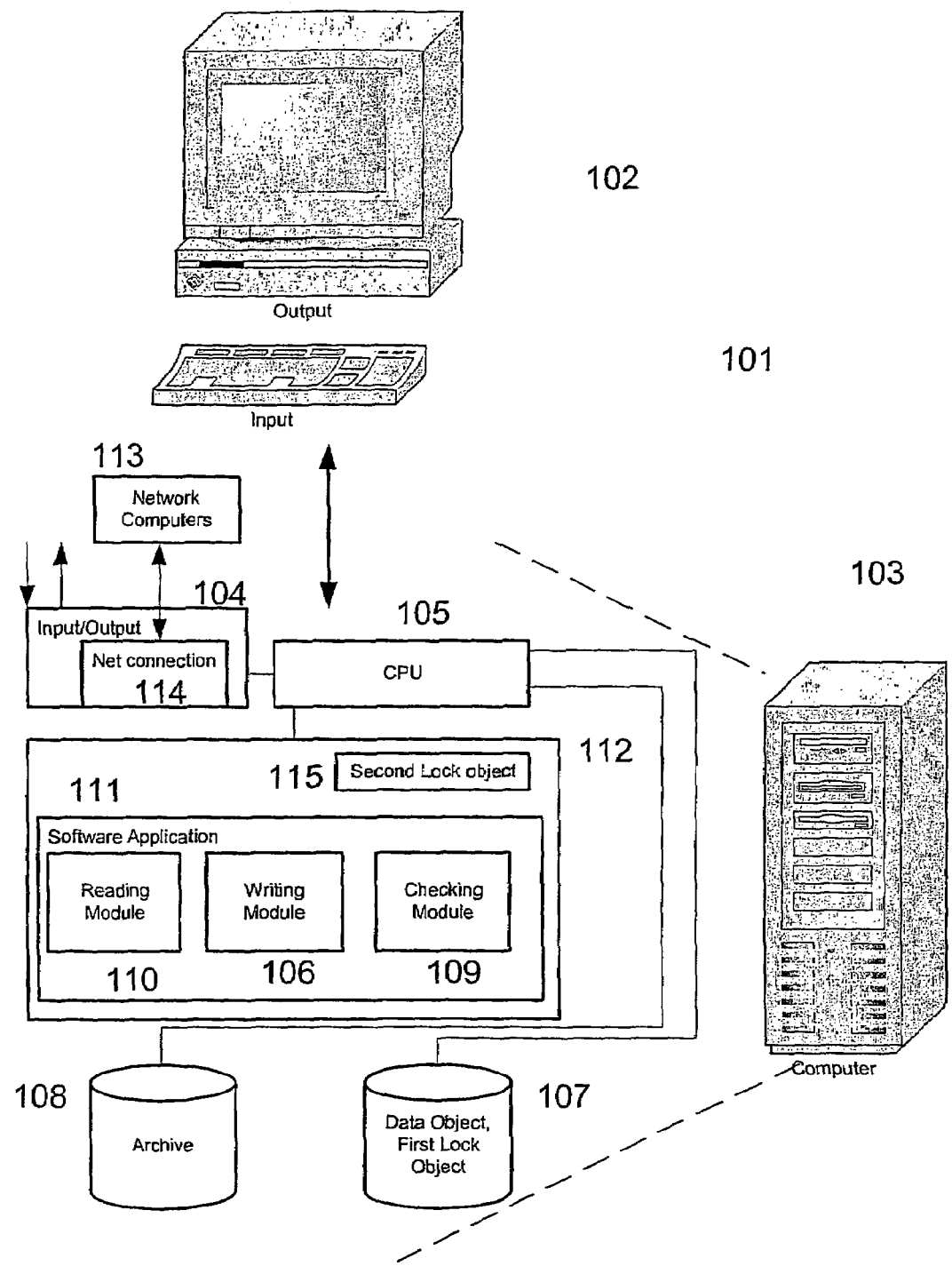
FIG. 1 is a schematic block diagram of an exemplary computer system for implementing methods consistent with the present invention.

Computer systems and programs are closely related. As used hereinafter, phrases, such as "the computer provides," "the program provides or performs specific actions," and "a user performs a specific action" are convenient abbreviations to express actions by a computer system that is controlled by a program or to express that the program or program module is designed to enable the computer system to perform the specific action or the enable a user to perform the specific action by means of a computer system.

Reference will now be made in detail to the principles of the invention by explaining the invention on the basis of the archiving process, examples of which are illustrated in the accompanying drawings. Examples, mentioned therein, are intended to explain the invention and not to limit the invention in any kind.

Within the concept of this description, the terms used shall have their usual meaning in the context of the field of data processing unless defined otherwise in the following section:

A computer system can be a stand alone computer such as a PC or a laptop or a series of computers connected as a network, e.g. a network within a company, or a series of computers connected via the internet. A data object to be archived can be any kind or type of data, e.g. numerical or textual data, image data, meta data, irrespective whether the data are implemented as whole files or parts of files or fields in tables, irrespective whether they are stored in volatile memory or nonvolatile memory. As an example, data objects according to the present invention can be implemented as one or more fields of one or more tables, particularly of tables of a relational data base system, or as objects in an object orientated programming language.

The term ERP software shall be considerer to comprise any software application that supports the business processes of an enterprise.

A storage location is volatile or nonvolatile (permanent) storage means accessible by the computer system, whereby the volatile storage means loses its content if the electric power supply is switched off. A storage location can be any kind of computer storage means known to one of ordinary skill, e.g. RAM, magnetic or optical storage, such as floppy disk, hard disk, MO-Disk, CD-ROM, CD RW, DVD ROM, DVD RW, etc.

An identifier (ID) is a type of data, which allows an unambiguous identification of the data object to be archived; it can be implemented for example as a number or a combination of alphanumerical characters or as a characteristic part of the data object to be archived. It is clear from that definition that a data object can have a wide variety of IDs. A lock object is a data object, in which the identifiers are stored. It can be implemented e.g. as a file on a storage means or as a data array in computer memory. The first lock object can be stored advantageously in a nonvolatile storage means and the second lock object can be stored in volatile and/or nonvolatile storage means.

The assignment of a storage location to an ID can be implemented by a table, in which one field of a line contains the ID and an other field of that line contains a link to the second storage location, e.g. a file name. This table can be stored as a file on a nonvolatile storage means.

FIG. 1 is a schematic block diagram of an exemplary implementation of a computer system. FIG. 1 shows a computer system 101 comprising a computer 103 having a CPU 105, a working storage 112, in which an software application 111 is stored for processing by CPU 105. Further, the second lock object 115 is stored in working storage 112 as well, whereas the first lock object is stored on a first storage means 107. Software application 111 comprises program modules 106, 109, 110 for carrying out reading access, writing access and for checking whether the IDs of the selected data objects are contained in the first and second lock objects. Computer system 101 further comprises input means 113, output means 112 for interaction with a user, and general input/output means 104, including a net connection 114, for sending and receiving data. A plurality of computer systems 101 can be connected via the net connection 114 in the form of a network 113. In this case, the network computers 113 can be used as further input/output means, including the use as further storage locations. Computer system 103 further comprises the first storage means 107, in which the data objects and the first lock object are stored. A second storage means 108, is available for archiving purpose.

In case the program modules 106, 109, 110 are processed by CPU 105 in order to make use of the inventive data structure, one or more data objects stored in the first storage means 107 are selected and the checking module 109 checks before the data objects are accessed by reading module 110 or writing module 106, whether the ID of the selected data object or objects is contained in the first lock object and whether a link to the second or first storage location 107, 108 or to a file on these storage locations is assigned to said ID in said first lock object. In case said ID is not contained in said first lock object and/or no link is assigned to said ID, the call of the reading or writing module is skipped. The software application 111 can then be terminated and started anew at a later time. Alternatively, checking module 109 can be repeatedly called until the data object is free for access.

In a second implementation of the invention, a data object may comprise one or more fields of one or more tables, and the ID of the respective object may comprise one or more key fields of that data object. This can be seen from FIG. 2. In this instance, various sets of data objects are created in the form of two-dimensional data arrays, i.e. two tables having columns named field A to field X and field A to field Y, respectively, and a certain, unspecified number of lines. A field of the array or table is defined by the name of the column and the respective line. Such field can contain data to be archived. It can alternatively contain a reference to a line of a further table. For example, in table 1 field X in line 2 contains a reference to line 3 in table 2. A data object to be archived comprises of fields of one line of the respective table. If one of the fields contains a reference to a line of an other table, fields of this referenced line belong to the data object, tee as well. In the example in FIG. 2, a data object to be archived comprises the fields of line 2 in table 1 and fields of line 3 in table 2.

An ID of such a data object can be implemented by the content of one or more so-called key fields, if the combination of these key fields is unique within the respective table. In the example, the fields of "field A" and "field B" can be used as key fields for table 1, whereas field A alone is key field in table 2. Within this example, the data object has the content of the fields of columns field A and B of the respective lines as ID. The ID for the data object to be archived is stored as a first type ID in a first type lock object, named persistent lock object in FIG. 2, and as a second type ID in a second type lock object, named transactional lock object. The persistent lock object may be implemented as a table having two columns, the first of which contains the first type ID 1. The second type ID, ID 2, can be implemented as a data array, for example, as a one-dimensional data array stored in the working memory of the computer system. However, it can be implemented as a file on a nonvolatile storage means, too. The first type ID, ID 1, is deleted in a moving or archiving process after the selected data object has been deleted from its original storage location. The second type ID, ID 2, is deleted immediately after a read or write access on a data object has been completed. Alternatively, type ID 1 IDs can be deleted after all the selected data objects have been deleted from the original storage location. As can be seen, both ID types have identical content, the ID of the respective lines of the data to be moved/archived. The persistent lock objects further contain a column by which a filename may be assigned to the ID of the data object, i.e. that data object to be archived. In the example, line 1 is archived in a file named 001, lines 2 and 3 in file 002, and line 4 in file 003.

Selection of the data object can be implemented by an automatic procedure, such as a simple query, that returns all lines having a certain field that satisfy a certain condition. For example, the procedure could return all lines in which the content of a date field pre-dates or post-dates a certain deadline. Selection can also be implemented by a user to whom a selection table is presented via a graphical user interface.

A further embodiment may comprise of first and second lock objects that are created by an data moving or data archiving process.

In order to better understand the inventive data structure and its advantages, the creation of the lock objects is now described in more detail with reference to FIGS. 3 to 5, which are schematic flow diagrams of exemplary methods that may be implemented by the data moving or archiving processes, respectively, as shown in FIG. 1. Within the context of this description, and particularly with respect to FIGS. 3 to 9, a first type ID is called a P-lock (permanent) and a second type ID is called a T-lock (transactional). Therefore, setting a P- or T-lock for a selected object means to store an ID of that object in a respective lock object. The term "permanent" results for the property of the P-lock of existing permanently, as long as the data object is not yet deleted from its original storage location. The term "transactional" results from the property of the T-lock of existing only as long as a specific action (e.g. checking of archiveability) is performed on a selected data object or, in other words, of being deleted after the respective action has been performed.

Figure 3:
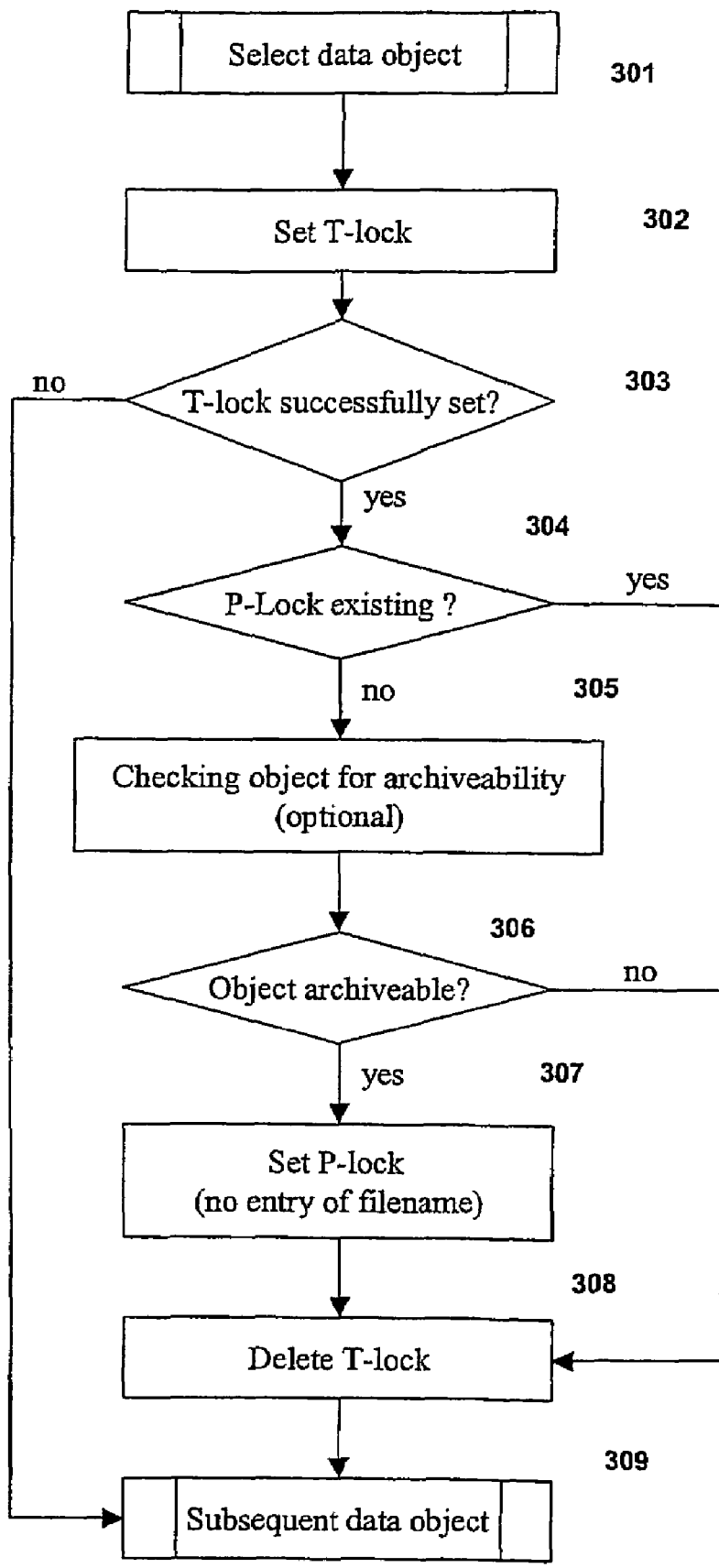
FIG. 3 is a flow diagram of an exemplary implementation of the creation of a first and second lock object shown in FIG. 1.

In the exemplary flow chart of the selecting module in FIG. 3, a data object is selected in a first step 301. Subsequently, a T-lock is set on this object in step 302. If the T-lock was successfully set (step 303), that is, if it did not yet exist, it is checked in step 304 whether a P-lock already exists in the selected data object. If not, the next data object is selected in step 309. The setting of the T-lock (step 302) and the check (step 303) whether it is successfully set, can advantageously be implemented as one "atomic" step. This means that both steps can be executed essentially at the same time or, in other words, the time gap between both steps can be essentially zero.

Both checks (steps 303 and 304) can also be implemented by querying the respective lock objects. If a P-lock exists, the T-lock is deleted (step 308) and the next data object is selected (step 309). If no P-lock exists, it is checked in steps 305 and 306 whether the data object is archiveable. Such checking comprises a test of whether the data in the data object is readable, complete, or not fraught with obvious failures, etc. If the test is successful, a P-lock is set on that data object in step 307, whereby no archive file is assigned to the data object at that point. Then the T-lock is deleted (step 308) and the next data object is selected (step 309).

Figure 4:
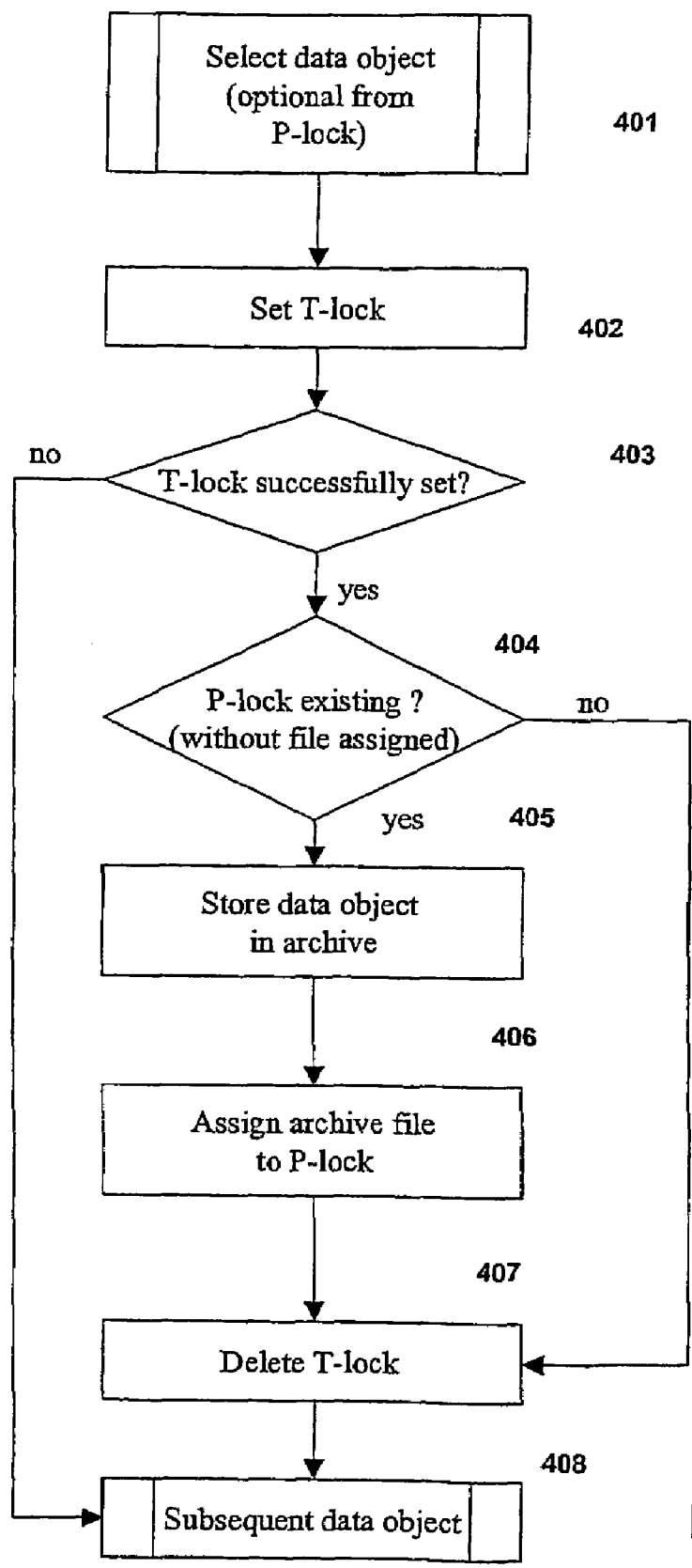
FIG. 4 is a flow diagram of an alternative exemplary implementation of the creation of a first and second lock object shown in FIG. 1.

In the exemplary flow chart of the writing module in FIG. 4, a data object is selected in a first step 401. Subsequently, a T-lock is set on this object in step 402. If the T-lock was successfully set (step 403), it is checked in step 404 whether a P-lock already exists in the selected data object, whereby no file must be assigned to that data object at that point of the process. If the condition is not fulfilled, the T-lock is deleted in step 407, and the next data object is selected in step 408. If a P-lock exists, the data object is stored in an archive file in step 405 and the archive file is assigned to the data object in step 406, e.g., by adding the file name to the lock object as shown in FIG. 2. Subsequently, the T-lock is deleted (step 407), and the next data object is selected (step 408).

Figure 5:
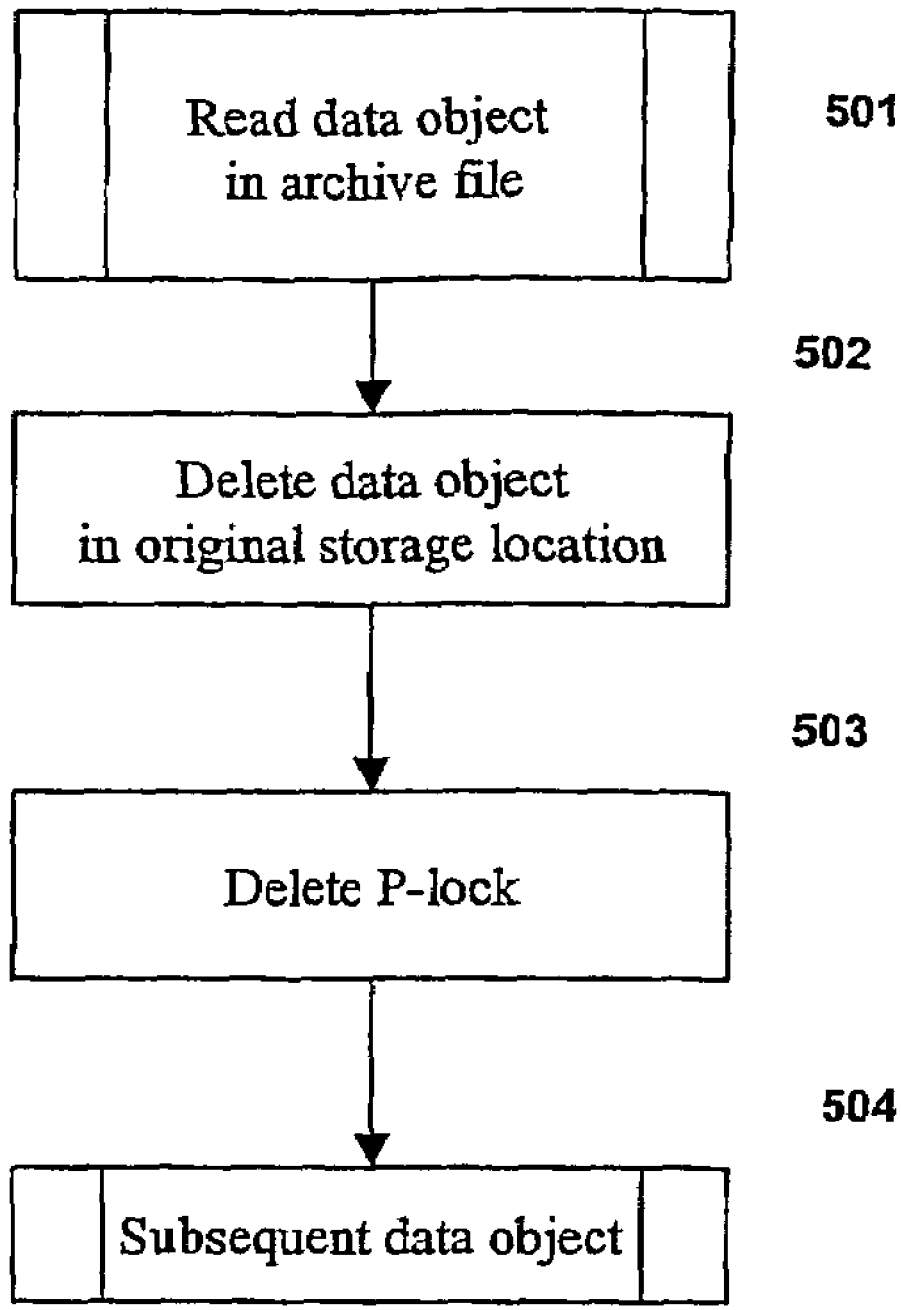
FIG. 5 is a flow diagram of an exemplary implementation of a deleting process in the context of data moving/archiving.

In the exemplary flow chart of the deleting module in FIG. 5, a data object that has already been archived is selected (step 501). This can be implemented by checking the archive files. If a data object has been selected and successfully read from the archive file, that data object is deleted from the original storage location (step 502), the P-lock is deleted (step 503), and the next data object is selected (step 504).

Figure 6:
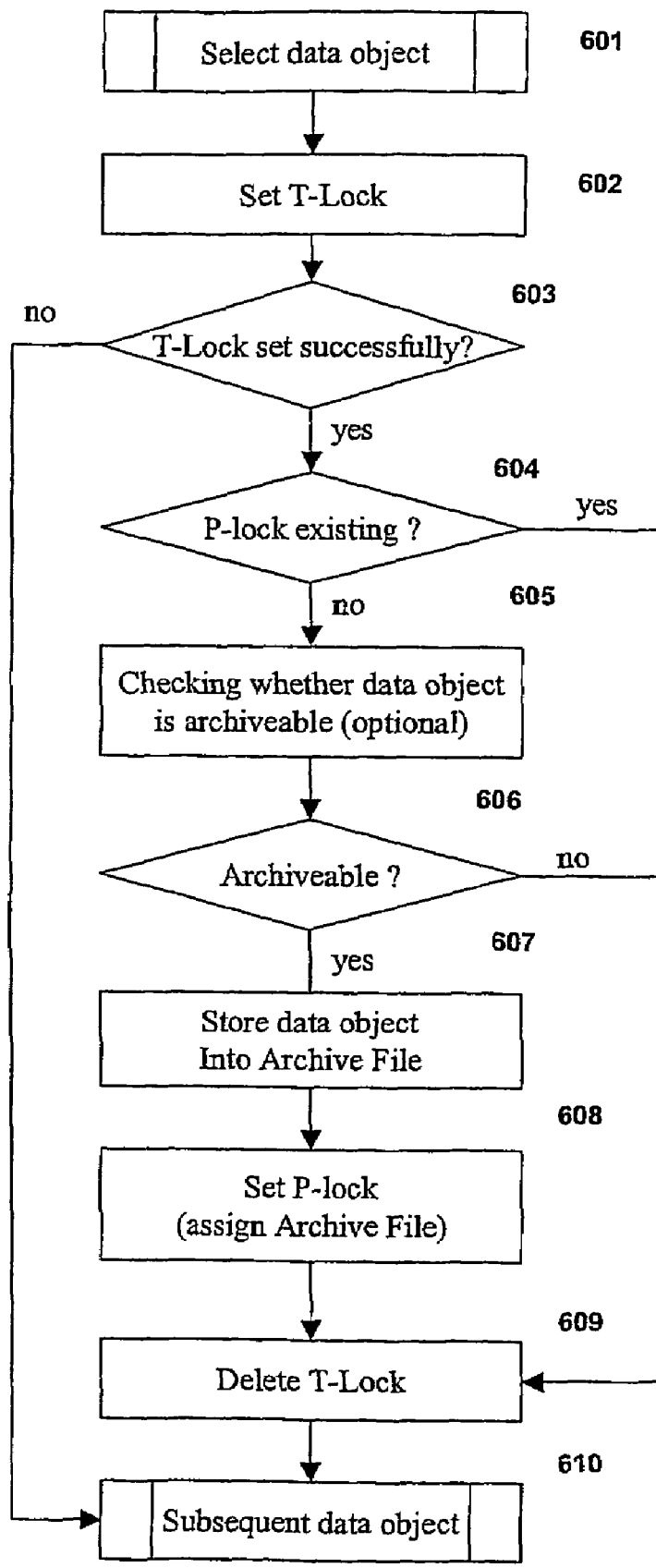
FIG. 6 is a flow chart of a further exemplary implementation of the creation of a first and second lock object shown in FIG. 1.

In the exemplary flow chart of a further exemplary implementation of the creation of a lock object in FIG. 6, the processes, as described above with respect to FIGS. 3 and 4, are combined to one module. Accordingly, a data object is selected in a first step 601. Subsequently, a T-lock is set on this object in step 602. If the T-lock was successfully set (step 603), it is checked in step 604 whether a P-lock already exists in the selected data object. If the T-lock was not successfully set, the next data object is selected (step 610). If a P-lock exists on that object, the T-lock is deleted (step 609) and the next data object is selected (step 610). If no P-lock exists on that object, it is checked in step 605 whether the data object is archiveable. If this check fails (step 606), the T-lock is deleted (step 609), and the next data object is selected (step 610). If the check is positive, the data object is stored (step 605) in an archive file, a P-lock is set (step 608) with the archive file assigned, the T-lock is deleted (step 609) and the next data object is selected (step 610).

Figure 7:
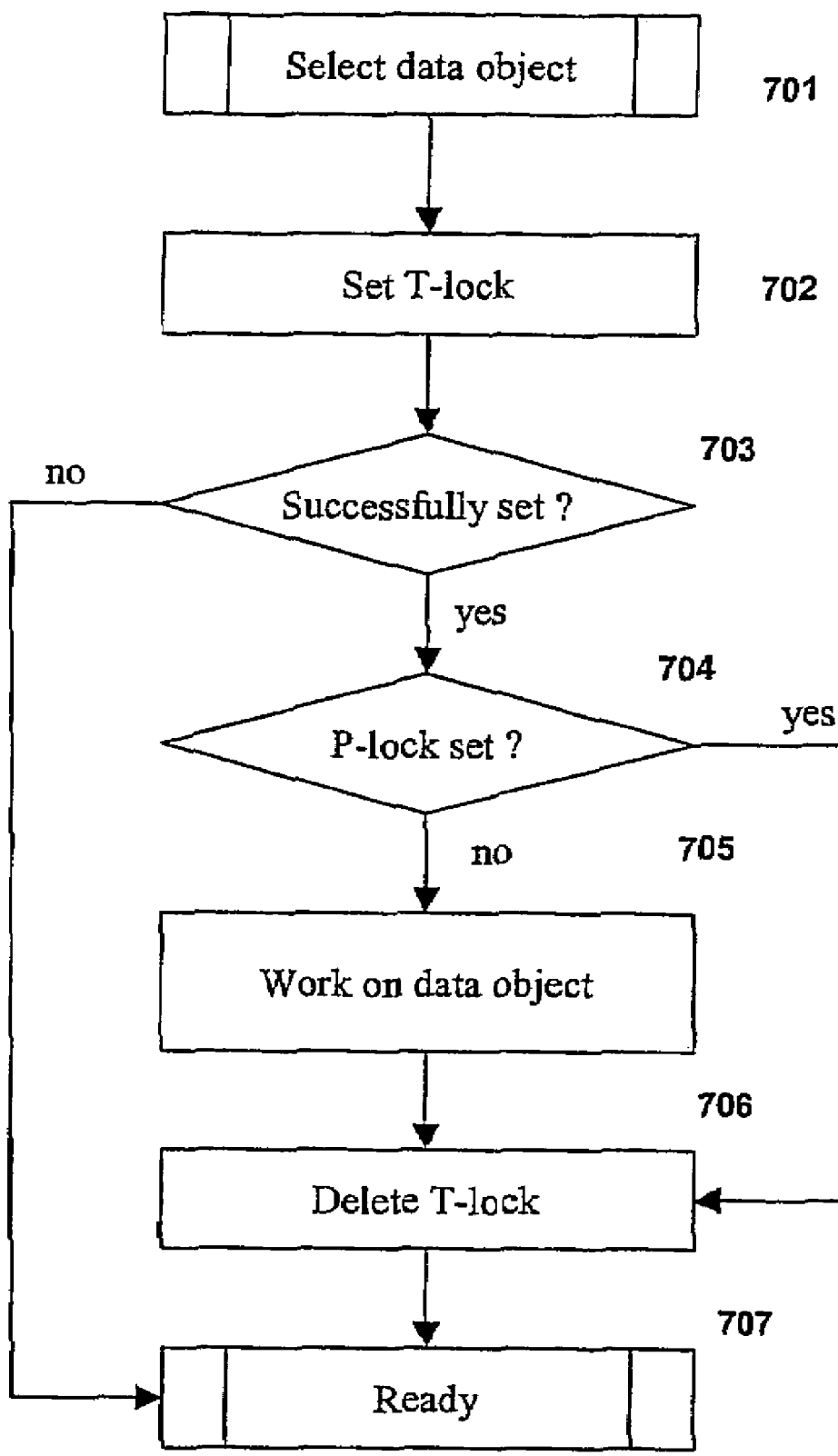
FIG. 7 is a flow chart of an exemplary method to demonstrate how any software application use the inventive concept of the first and second lock object.

FIG. 7 shows a flow chart of an exemplary method to demonstrate how any software application according to the invention can use the inventive concept of the P and T-locks to ensure that the measures, that the software application is going to apply on the data object, do not influence the archiving process. A software application which is programmed to have a read and/or write access to data objects, which can be subject of an archiving process as described, may comprise the following steps as shown in FIG. 7. In a first step 701, the data object is selected. Then a T-lock is set in step 702 on that object by the application. If the T-lock is successfully set (step 703), it is checked in step 704, whether a P-lock exists on that object; otherwise the application terminates in step 707. If a P-lock exists on that object (step 704), the T-lock is deleted (step 706), and the application terminates (step 707). If no P-lock exists, i.e., the data object is not subject to an archiving process, the application can have read/write access to the data object in a working step 705. Subsequently the application deletes the T-lock (step 706) and terminates (step 707).

Figure 8:
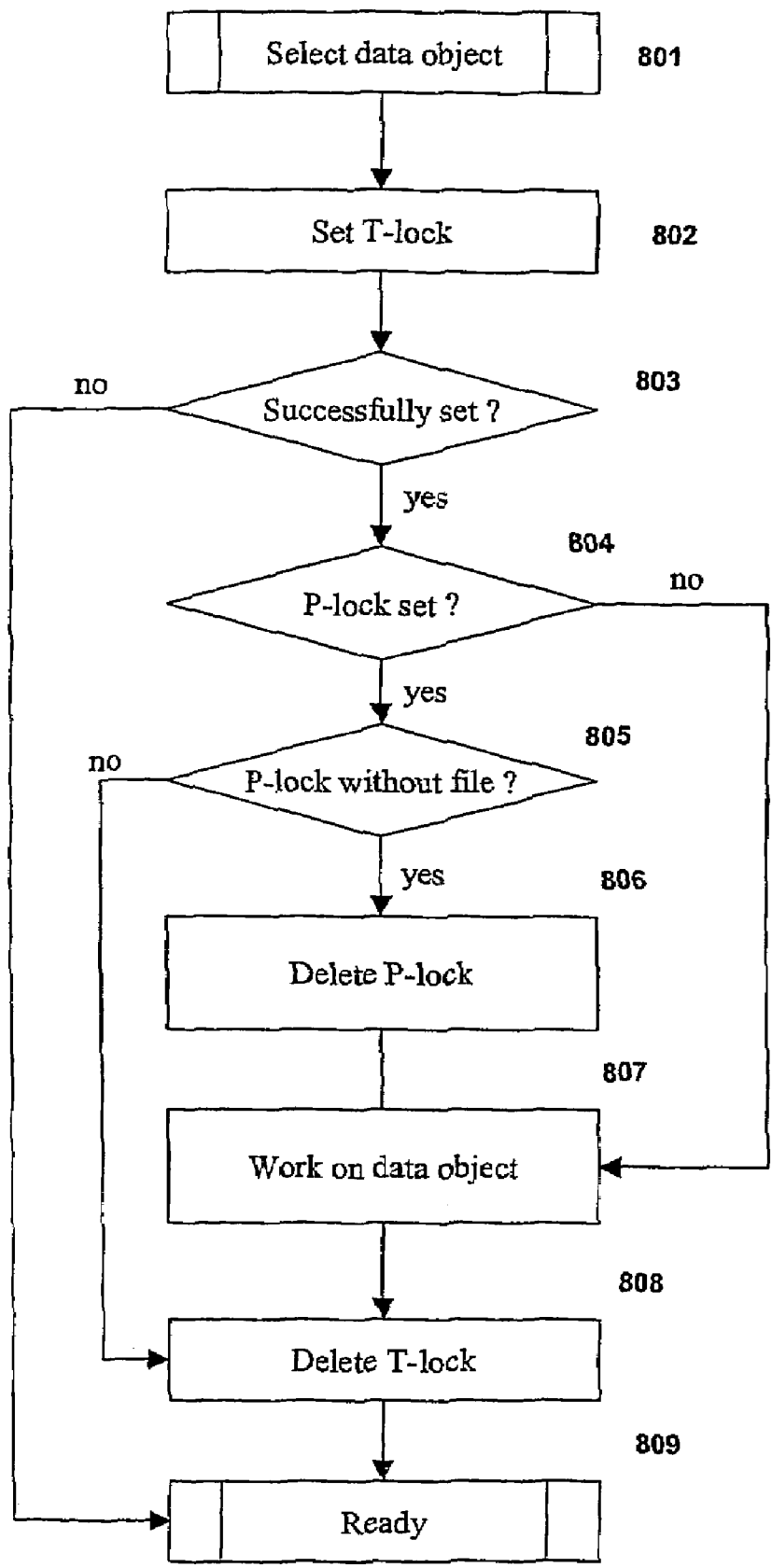
FIG. 8 is a flow chart of an exemplary method to demonstrate how any software application may use the concept of the first and second lock object, including a conditional deletion of a P-lock.

FIG. 8 is a flow chart of another exemplary method to demonstrate how any software application may use the concept of the first and second lock objects, including a conditional deletion of a P-lock. In a first step 801, the data object is selected. Then, a T-lock is set on that object by the application (step 802). If the T-lock is successfully set (step 803), it is checked (step 804), whether a P-lock exists on that object; otherwise the application terminates (step 809). If no P-lock exists (step 804), i.e., the data object is not subject to an archiving process, the application can have read/write access to the data object in working step 807. Subsequently, the application deletes the T-lock (step 808) and terminates (step 809). If a P-Lock exists 804, it is checked 805 whether a file is assigned to it. If a file is assigned, the application deletes the T-lock (step 808) and terminates (step 809). If no file is assigned, the P-lock is deleted (step 806), and the application can have read/write access to the data object (step 807). Subsequently, the application deletes the T-lock (step 808) and terminates (step 809).

This procedure is particularly useful, in that data objects, which are not yet stored in an archive file, can be still altered. Consequently, they can be archived only at the next archive run.

Figure 9:
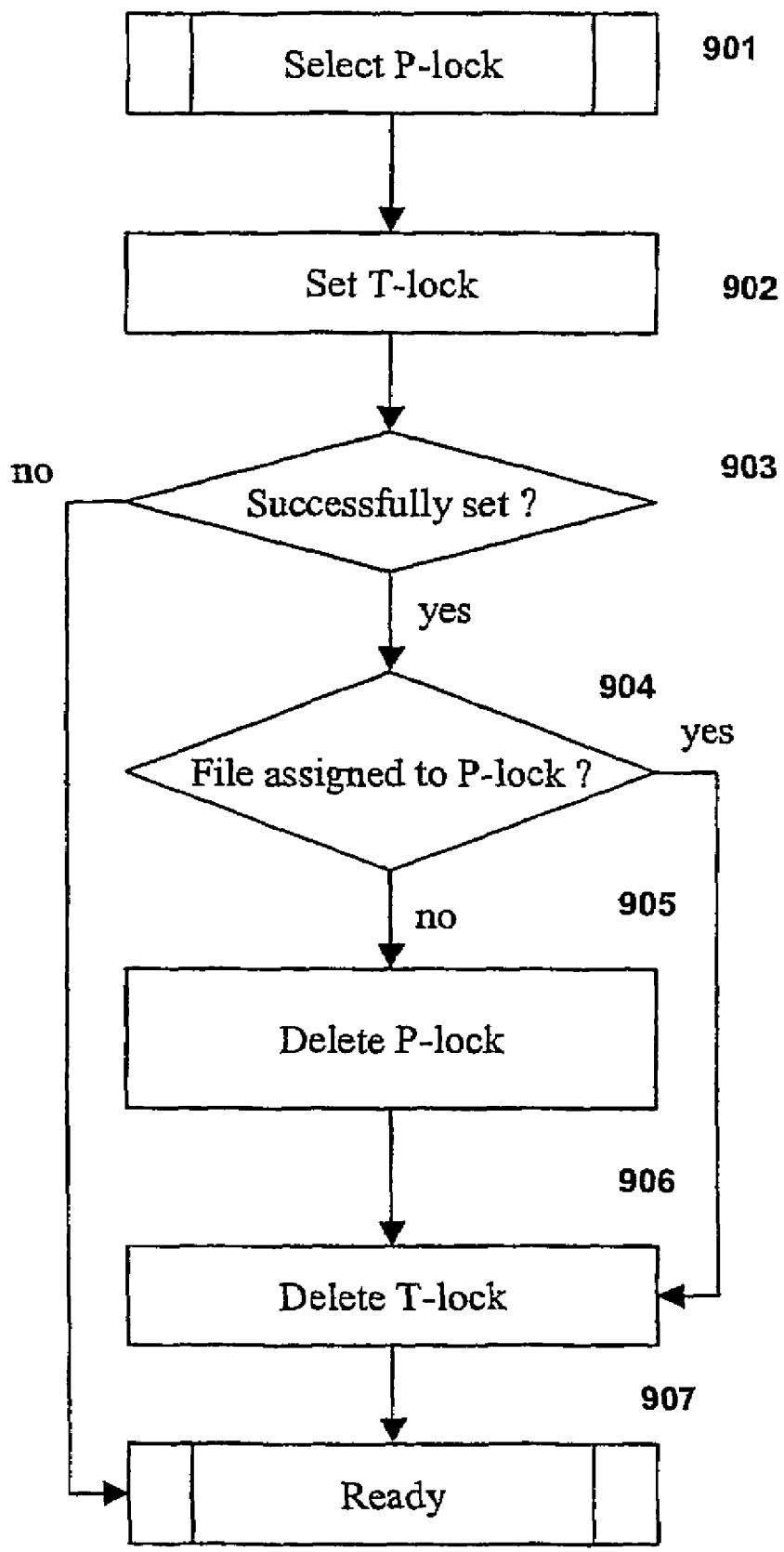
FIG. 9 is a flow chart for an exemplary method for implementation by a software module through which the locks can be deleted.

FIG. 9 is a flow chart of an exemplary method for implementation by a software module through which the locks set by the modules described above can be deleted. This can be useful in cases in which no archive files are assigned to P-locks or in which P-locks have been deleted for a user. Therein, a P-lock is nothing else than a data object and can be treated in the same way as described above. In a first step 901, a P-lock is selected. Then, a T-lock is set to the P-lock in step 902. If the T-lock is successfully set (step 903), it is checked in step 904, whether the P-lock has a file assigned. If the T-lock is not set successfully, the module terminates (step 907). If the selected P-lock has no file assigned (step 904), the P-lock is deleted (step 905). Then, the T-lock is deleted (step 906), and the module terminates (step 907). Alternative to the termination step 907, a next P-lock can be selected.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or can be acquired from the practicing of the invention. For example, the described implementation includes software, but systems and methods consistent with the present invention can be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of ® Java, C++, HTML, XML, or HTML with included Java applets or in SAP R/3 or ABAP.

What is claimed is:

1. A data structure tangibly embodied in a computer-readable storage medium, the data structure preventing access, in a computer system, to a data object stored in a first storage location, the data structure comprising:
   a first lock object, in which an ID of the data object is stored by a first process moving the data object from the first storage location to a second storage location, and in which a link to the second storage location storing a copy of the data object is assigned to the ID, the first lock object comprising a table with at least two columns, a first column for storing IDs of data objects and a second column for storing links to copies of the data objects in the second storage location; and
   a second lock object, in which the ID is stored by the first process performing an action on the data object before storing the ID in the first lock object or before assigning the second storage location to the ID in the first lock object, the second lock object comprising a one-dimensional data array of IDs of data objects, wherein:

the first process deletes the ID from the second lock object after storing the ID in the first lock object or after assigning the second storage location to the ID in the first lock object, and a second process is prevented from accessing the data object if the ID is stored in the first lock object or the second lock object by the first process.

2. The data structure of claim 1, wherein the link is a filename or a link to a file.

3. The data structure of claim 1, wherein the first lock object is a file stored in a nonvolatile storage means.

4. The data structure of claim 1, wherein the data object comprises one or more fields of one or more tables and wherein the ID comprises one or more key fields of the one or more tables.

5. The data structure of claim 1, wherein the second process is a data moving process or a data archiving process.

6. The data structure of claim 1, wherein the second lock object is stored in a volatile or nonvolatile storage means.

7. The data structure of claim 1 for use in enterprise resource planning software.

8. A computer system for processing data and preventing access to a data object stored in a first storage location, the computer system comprising:

memory means having program instructions;

input means for entering data;

storage means for storing data;

a processor responsive to the program instructions; and a data structure comprising:

a first lock object, in which an ID of the data object is stored by a first process moving the data object from the first storage location to a second storage location, and in which a link to the second storage location storing a copy of the data object is assigned to the ID, the first lock object comprising a table with at least two columns, a first column for storing IDs of data objects and a second column for storing links to copies of the data objects in the second storage location; and a second lock object, in which the ID is stored by the first process performing an action on the data object before storing the ID in the first lock object or before assigning the second storage location to the ID in the first lock object, the second lock object comprising a one-dimensional data array of IDs of data objects, wherein:

the first process deletes the ID from the second lock object after storing the ID in the first lock object or after assigning the second storage location to the ID in the first lock object, and a second process is prevented from accessing the data object if the ID is stored in the first lock object or the second lock object by the first process.

9. A computer readable medium storing executable instructions which, when executed, create a data structure for preventing access, in a computer system, to a data object stored in a first storage location, the data structure comprising:

a first lock object, in which an ID of the data object is stored by a first process moving the data object from the first storage location to a second storage location, and in which a link to the second storage location storing a copy of the data object is assigned to the ID, the first lock object comprising a table with at least two columns, a first column for storing IDs of data objects and a second column for storing links to copies of the data objects in the second storage location; and a second lock object, in which the ID is stored by the first process performing a action on the data object before storing the ID in the first lock object or before assigning the second storage location to the ID in the first lock object, the second lock object comprising a one-dimensional data array of IDs of data objects, wherein:

the first process deletes the ID from the second lock object after storing the ID in the first lock object or after assigning the second storage location to the ID in the first lock object, and a second process is prevented from accessing the data object if the ID is stored in the first lock object or the second lock object by the first process.

10. The data structure of claims 8 or 9, wherein the link is a filename or a link to a file.

11. The data structure of claims 8 or 9, wherein the first lock object is a file stored on a nonvolatile storage means.

12. The data structure of claims 8 or 9, wherein the data object comprises one or more fields of one or more tables and wherein the ID comprises one or more key fields of the one or more tables.

13. The data structure of claims 8 or 9, wherein the the second process is a data moving process or a data archiving process.

14. The data structure of claims 8 or 9, wherein the second lock object is stored in a volatile or nonvolatile storage means.

* * * * *